(12) United States Patent
Schade

(10) Patent No.: US 8,727,309 B2
(45) Date of Patent: May 20, 2014

(54) FLUID VALVES HAVING ADJUSTABLE SEALING CHARACTERISTICS

(75) Inventor: Ross Arthur Schade, Ames, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 656 days.

(21) Appl. No.: 12/426,009

(22) Filed: Apr. 17, 2009

(65) Prior Publication Data

US 2010/0264351 A1    Oct. 21, 2010

(51) Int. Cl.
F16K 25/00 (2006.01)

(52) U.S. Cl.
USPC ......... 251/192; 251/165; 251/307; 251/315.1

(58) Field of Classification Search
USPC ......... 251/306–308, 214, 157, 164, 165, 192, 251/187, 188, 318, 324
See application file for complete search history.

(56) References Cited

U.S. PATENT DOCUMENTS

| | | | |
|---|---|---|---|
| 3,556,476 A * | 1/1971 | Haenky | 251/306 |
| 3,724,813 A * | 4/1973 | Baumann | 251/360 |
| 4,632,140 A * | 12/1986 | Harding | 137/315.21 |
| 5,343,841 A | 9/1994 | Hattori et al. | |
| 6,267,353 B1 * | 7/2001 | Friedline et al. | 251/315.1 |
| 6,286,550 B1 * | 9/2001 | Yamaki et al. | 137/625.34 |

FOREIGN PATENT DOCUMENTS

WO         00/63597 A2    10/2000

OTHER PUBLICATIONS

Patent Cooperation Treaty, "International Search Report," issued by the International Searching Authority in connection with related PCT application No. PCT/US2010/029091, mailed Aug. 6, 2010 (4 pages).
Patent Cooperation Treaty, "Written Opinion of the International Searching Authority," issued by the International Searching Authority in connection with related PCT application No. PCT/US2010/029091, mailed Aug. 6, 2010 (5 pages).
Chinese State Intellectual Property Office, "First Office Action," issued in connection with Chinese Application No. 201080017188.0, mailed on Feb. 17, 2013, 12 pages.
State Intellectual Property Office of the People's Republic of China, "The Second Office Action," issued in connection with Chinese Application No. 201080017188.0, Jan. 26, 2014, 15 pages.

* cited by examiner

*Primary Examiner* — John K Fristoe, Jr.
*Assistant Examiner* — Marina Tietjen
(74) *Attorney, Agent, or Firm* — Hanley, Flight and Zimmerman, LLC

(57) ABSTRACT

Fluid valves having adjustable sealing characteristics are described. An example fluid valve includes a valve body having a flow aperture to enable the flow of fluid therethrough. Additionally, the fluid valve includes a seal surrounding the flow aperture and a sealing member having a shaft extending therefrom. The sealing member is movable relative to the seal and the flow aperture to control the flow of fluid through the flow aperture. Further, the fluid valve includes a support body movably coupled to the valve body and having a passage to receive the shaft. The support body holds the shaft and the sealing member to enable rotation of the shaft and the sealing member relative to the valve body and the seal, and at least one of the support body or the valve body includes at least one elongated opening to enable movement of the support body relative to the valve body to change an amount of engagement between the sealing member and the seal when the fluid valve is in a closed position.

19 Claims, 5 Drawing Sheets

FLUID VALVES HAVING ADJUSTABLE SEALING CHARACTERISTICS

FIELD OF THE DISCLOSURE

This patent relates generally to fluid valves and, more specifically, to fluid valves having adjustable sealing characteristics.

BACKGROUND

Process control plants or systems often employ rotary valves, such as ball valves, butterfly valves, eccentric-disk valves, eccentric-plug valves, etc., to control the flow of process fluids. Rotary valves typically include a fluid flow control member (e.g., a disk, a ball, etc.) disposed in the fluid path and rotatably coupled to the body of the valve via a shaft. To control the flow of fluid through some rotary valves, the position of the fluid flow control member may be varied from a closed position at which the fluid flow control member is in sealing engagement with a seal that surrounds a flow aperture to a fully open or maximum flow rate position at which the fluid flow control member is spaced away from the seal.

Generally, increasing the amount of engagement between the fluid flow control member and the seal when the rotary valve is in the closed position reduces leakage through the valve and increases the amount of breakout torque required to move the fluid flow control member from the closed position toward an open position. Conversely, decreasing the amount of engagement between the fluid flow control member and the seal when the rotary valve is in the closed position tends to increase leakage through the valve and decreases the amount of breakout torque required to move the fluid flow control member from the closed position toward an open position.

SUMMARY

An example fluid valve includes a valve body having a flow aperture to enable the flow of fluid therethrough. Additionally, the fluid valve includes a seal surrounding the flow aperture and a sealing member having a shaft extending therefrom. The sealing member is movable relative to the seal and the flow aperture to control the flow of fluid through the flow aperture. Further, the fluid valve includes a support body movably coupled to the valve body and having a passage to receive the shaft. The support body holds the shaft and the sealing member to enable rotation of the shaft and the sealing member relative to the valve body and the seal, and at least one of the support body or the valve body includes at least one elongated opening to enable movement of the support body relative to the valve body to change an amount of engagement between the sealing member and the seal when the fluid valve is in a closed position.

DETAILED DESCRIPTION

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness. Additionally, several examples have been described throughout this specification. Any features from any example may be included with, a replacement for, or otherwise combined with other features from other examples.

The examples described herein relate to rotary valves having adjustable sealing characteristics that extend the maintenance intervals at which a worn seal is replaced and/or decrease the urgency to replace a worn or defective seal. Additionally, the adjustable sealing characteristics of the example valves described herein enable an amount of breakout torque to be adjusted, thereby increasing the overall control, stability and/or accuracy of fluid process systems to which the rotary valve is coupled and/or tailoring the amount of breakout torque to suit the positioner or actuator coupled to the valve.

The example rotary valves described herein include a sealing member having a shaft that extends through a passage of a support body (e.g., a bonnet) that is movably coupled to a valve body. To enable the support body to be movable relative to the valve body and along a fluid flow path through the valve body, the valve body defines an elongated opening into which a portion of the support body is positioned. To further enable the support body to be movable relative to the valve body and along the fluid flow path through the valve body, the support body defines a plurality of oversized or slotted passages or openings, which may receive a fastener to couple the support body to the valve body. Specifically, the size and/or shape of the elongated opening that receives the support body and the size and/or shape of the oversized or slotted passages relative to a shaft of the corresponding fastener enables movement of the support body relative to the valve body and, thus, the sealing member to change an amount of engagement between the sealing member and a seal that surrounds a flow aperture when the rotary valve is in a closed position.

Figure 1:
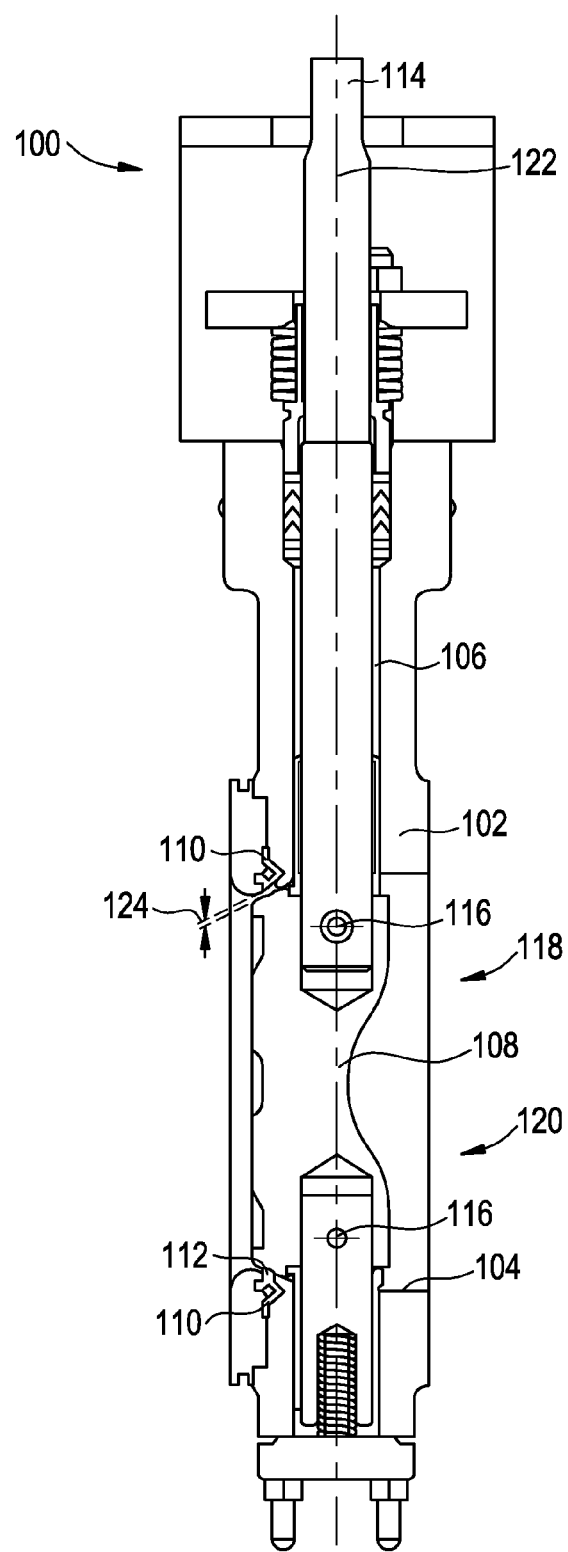
FIG. 1 depicts a known butterfly valve.

FIG. 1 depicts a known butterfly valve 100 that includes a body 102 that defines an aperture 104 and a bore 106. A fluid flow control member or disk 108 is at least partially positioned within the aperture 104 to engage a seal assembly 110 (e.g., a seal ring, etc.) that includes a soft seal 112 (e.g., a rubber seal, a synthetic seal). Additionally, the fluid flow control member 108 is coupled to a shaft 114 via a plurality of pins 116 (e.g., a primary connection) positioned on opposite ends of the fluid flow control member 108. As shown in FIG. 1, this coupling secures both an upper portion 118 and a lower portion 120 of the fluid flow control member 108 relative to the butterfly valve 100, thereby maintaining a position of the fluid flow control member 108 along an axis 122 of the butterfly valve 100.

In operation, the fluid flow control member 108 engages the seal assembly 110 to control the flow of the fluid through the aperture 104 and, thus, the rate of fluid flow through the butterfly valve 100 is controlled by the position of the fluid flow control member 108 relative to the seal assembly 110. The position of the fluid flow control member 108 may be varied from a closed position or condition at which the fluid flow control member 108 is in sealing engagement with the seal assembly 110 to a fully open or maximum flow rate position at which the fluid flow control member 108 is spaced away from the seal assembly 110 and/or substantially parallel to the flow of fluid through the aperture 104.

Over time, the soft seal 112 of the seal assembly 110 may wear because of, for example, operational conditions (e.g., fluid characteristics) and/or due to interaction with the fluid flow control member 108, thereby reducing or eliminating the sealing functionality and/or characteristics of the soft seal 112. Specifically, as the soft seal 112 wears, a gap 124 may form between the fluid flow control member 108 and the soft seal 112, which permits fluid to flow through the butterfly valve 100 even though the fluid flow control member 108 is in the closed position, as shown in FIG. 1. To restore the sealing characteristics of the valve 100, the valve 100 must be decoupled from a fluid system (not shown) to which it is coupled and the worn soft seal 112 replaced.

Figure 2:
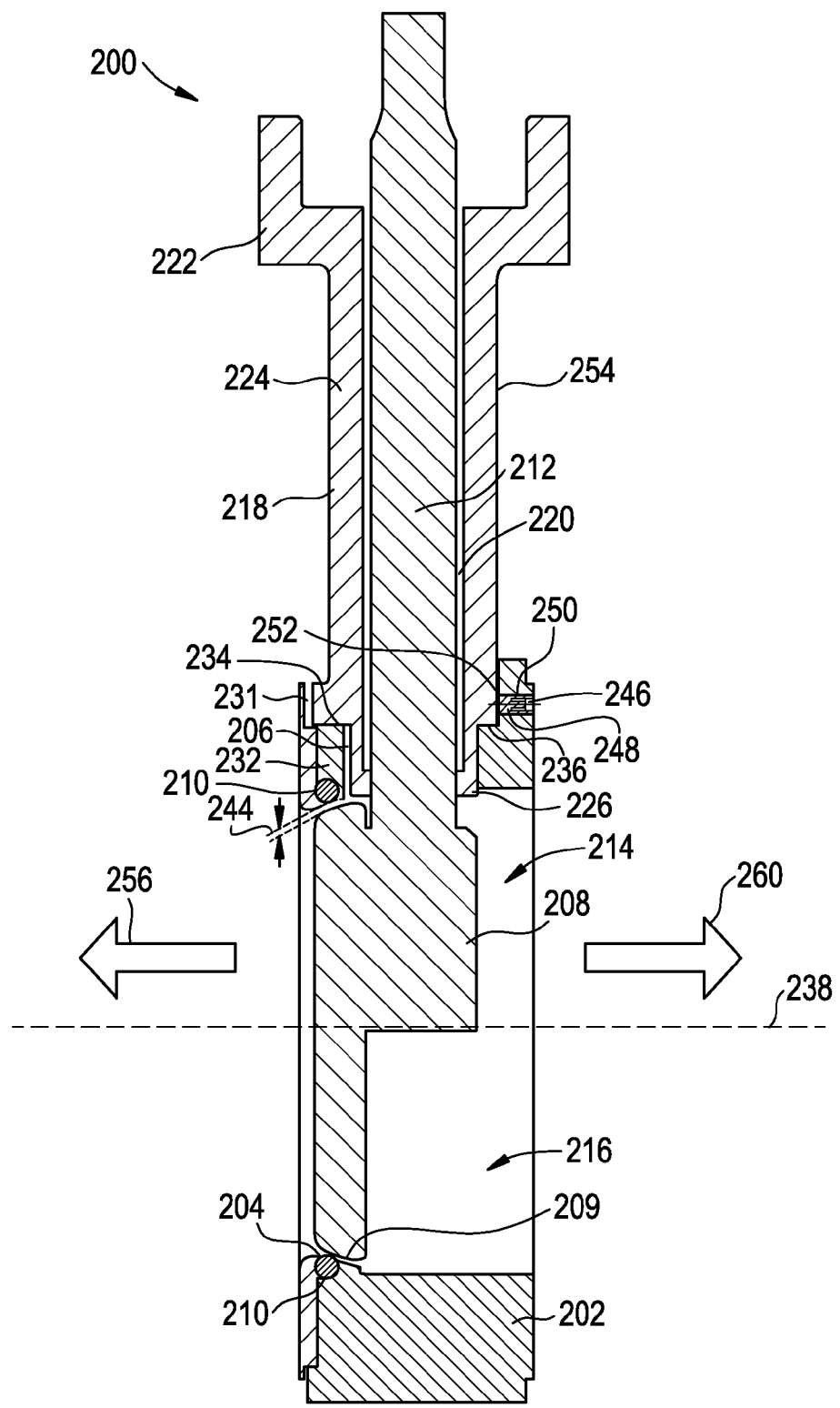
FIG. 2 depicts an example butterfly valve having an example adjustable support body and sealing characteristic.
Figure 4:
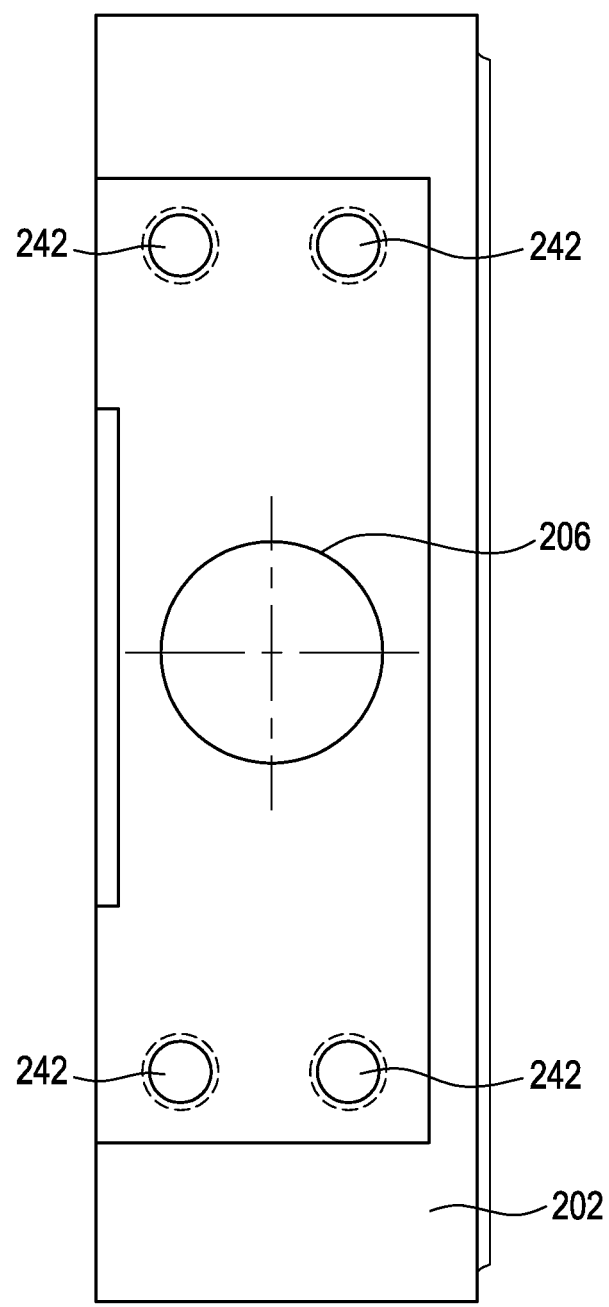
FIG. 4 depicts an example valve body of the butterfly valve of FIG. 2.

FIG. 2 depicts an example butterfly valve, a fluid valve or a rotary valve 200 that includes a valve body 202 that defines a flow aperture or first aperture 204 and an elongated opening or second aperture 206 (shown most clearly in FIG. 4). A sealing member or a fluid flow control member 208 is positioned at least partially within the flow aperture 204 and has a seat 209 to engage a seal or seating surface 210 (e.g., a compliant seal and/or a flexible seal) that surrounds the flow aperture 204. In contrast to the fluid flow control member 108 of FIG. 1 for which the upper and lower portions 118 and 120 are both coupled to or supported by the body 102 of the butterfly valve 100, the butterfly valve 200 of FIG. 2 includes a shaft 212 that extends from or which is coupled only to an upper portion 214 of the sealing member 208. Coupling the upper portion 214 of the sealing member 208 to the shaft 212 enables the sealing member 208 to be moved via a support body or bonnet assembly 218 relative to the flow aperture 204 along a fluid flow path through the flow aperture 204, as discussed below. However, in other examples, a lower portion 216 of the sealing member 208 may be movably coupled to the valve body 202 via another shaft (not shown).

The support body 218 defines a passage 220 that receives the shaft 212, which can rotate within the passage 220. Additionally, the support body 218 includes a collar 222, an elongated portion 224 and an end or portion 226 positioned in the elongated opening 206. Additionally, a portion 228 (FIG. 3) adjacent the end 226 of the support body 218 may be positioned within a recess 230 (FIG. 3) defined by the valve body 202. Generally, a size of the end 226 is smaller than a size of the elongated opening 206 such that a gap 231 exists between the support body 218 and the valve body 202 to enable the support body 218 to be adjusted relative to the valve body 202 along the fluid flow path through the valve body 202. While the elongated opening 206 is depicted in FIG. 4 as having an oval or slotted shape, the elongated opening 206 may have any other suitable shape. Alternatively, the opening 206 may be circular but oversized relative to the end 226 of the support body 218 to enable relative movement between the support body 218 and the valve body 202.

To maintain the position of the support body 218 relative to the valve body 202, the valve body 202 includes a step or shoulder 232 configured to be engaged by a corresponding surface 234 of the support body 218. In some examples, a surface 236 of the shoulder 232 may be substantially parallel relative to an axis 238 through the flow aperture 204 (e.g., parallel to the fluid flow path through the valve body 202).

Figure 5:
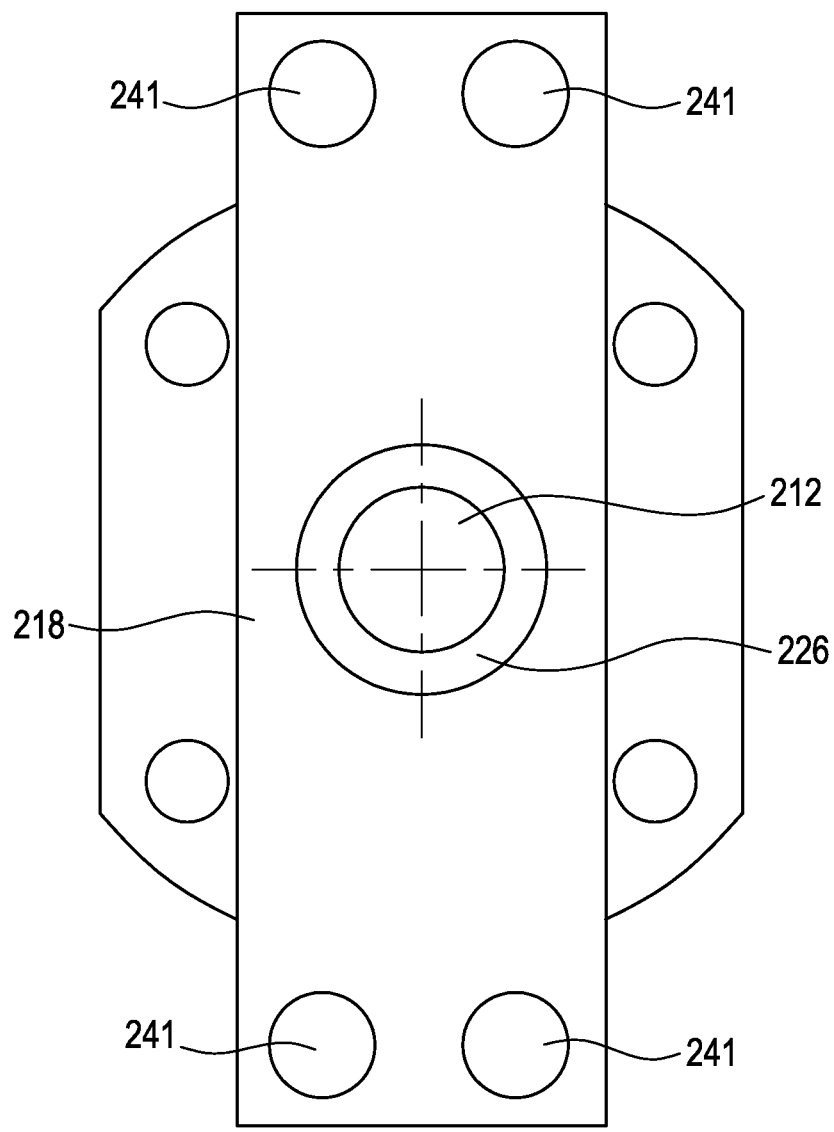
FIG. 5 depicts the example support body of the example butterfly valve of FIG. 2.

To movably couple the support body 218 to the valve body 202, the support body 218 defines a plurality of passages 241 (FIG. 5) and the valve body 202 defines a plurality of threaded holes 242 (FIG. 4) through which corresponding fasteners (not shown) are positioned. To enable the position of the support body 218 to be adjusted relative the valve body 202, the plurality of passages 241 (FIG. 5) are oversized relative to a shaft (not shown) of the corresponding fasteners. While the plurality of passages 241 are depicted in FIG. 5 as having a substantially circular shape, the plurality of passages 241 (FIG. 5) may have any other suitable shape to enable adjustment of the support body 218 relative to the valve body 202 such as, for example, a slotted shape, an oval shape, etc.

In operation, the position of the sealing member 208 may be varied from a closed position and/or condition at which the sealing member 208 is in sealing engagement with the seal 210 and a fully open or maximum flow rate position at which the sealing member 208 is spaced away from the seal 210 and/or substantially parallel to the flow of fluid through the flow aperture 204. Over time, the seal 210 may wear because of, for example, operational conditions and/or the interaction with the sealing member 208, thereby reducing or eliminating the sealing functionality or characteristics of the seal 210. Specifically, as the seal 210 wears, a gap 244 may form between the sealing member 208 and the seal 210, which permits fluid to flow through the butterfly valve 200 even though the sealing member 208 is in the closed position, as shown in FIG. 2. However, in contrast to the butterfly valve 100 of FIG. 1, the support body 218 may be adjusted relative to the valve body 202, thereby changing the amount of engagement between the sealing member 208 and the seal 210 and reducing and/or eliminating the gap 244 as depicted in FIG. 2.

Figure 3:
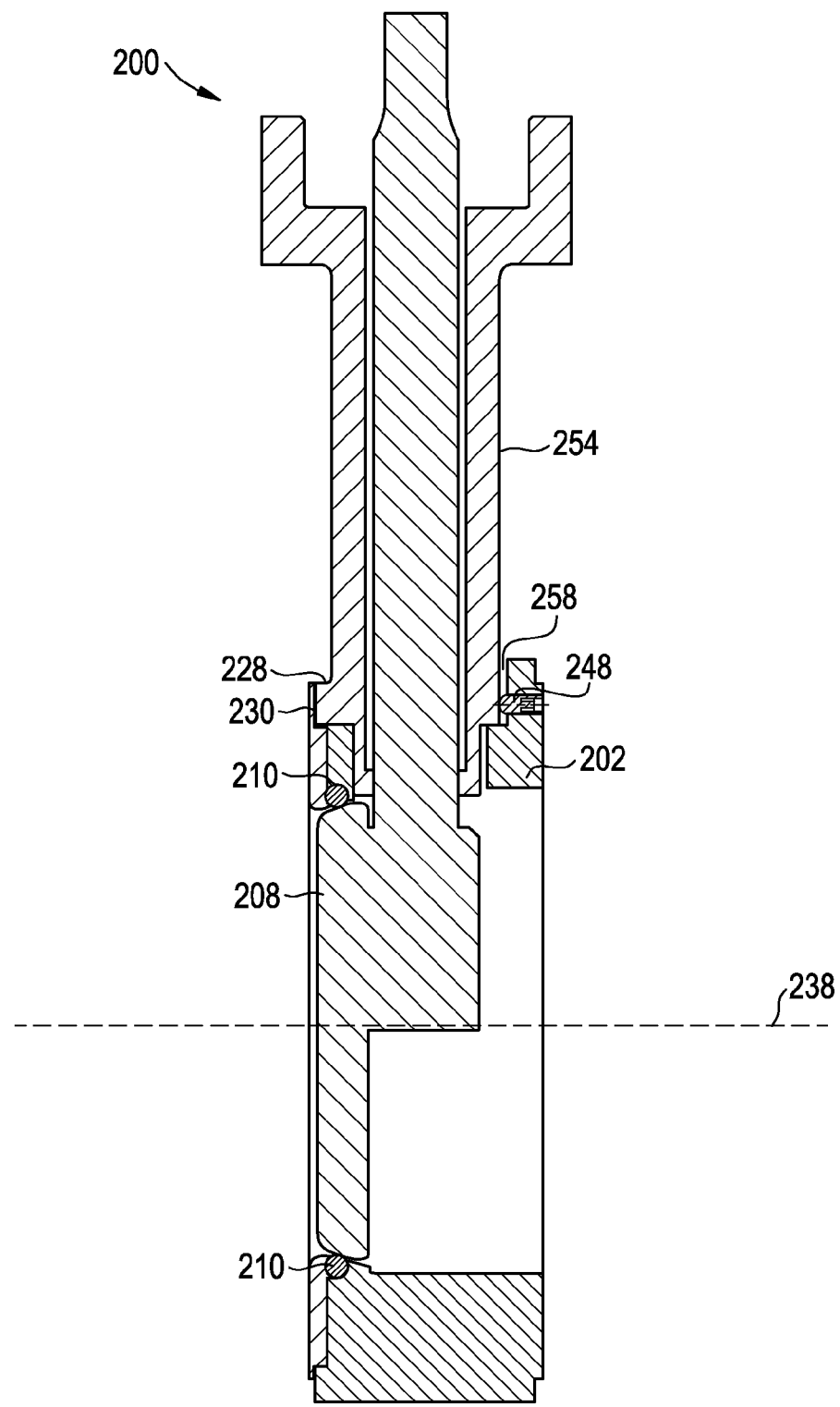
FIG. 3 depicts the example butterfly valve of FIG. 2 having the example support body adjusted in a different position.

To adjust the support body 218 relative to the valve body 202, the plurality of fasteners are loosened and a tool (not shown) is, for example, positioned within an orifice 246 of an externally accessible adjuster 248 that threadingly engages an opening 250 defined by the valve body 202. The external accessibility of the adjuster 248 further enables the position of the support body 218 to be field adjusted relative to the valve body 202. The tool that is inserted in the orifice 246 is then turned (e.g., clockwise or counter clockwise), to move an end 252 of the adjuster 248 to engage a surface 254 of the support body 218 and in a direction generally represented by arrow 256. Moving the support body 218 via the adjuster 248 in the direction generally represented by the arrow 256, decreases a size of the gap 244 and creates an opposing gap 258 (FIG. 3) between the surface 254 and the valve body 202. As the support body 218 moves in the direction generally represented by the arrow 256, the sealing member 208 moves toward and may eventually engage the seal 210, as shown in FIG. 3, to substantially prevent fluid from flowing through the flow aperture 204 when the sealing member 208 is in the closed position. After the support body 218 is adjusted to, for example, enable engagement between the sealing member 208 and the seal 210, the plurality of fasteners are again tightened to secure the support body 218 relative to the valve body 202. Such an approach extends the maintenance intervals at which a worn seal must be replaced and/or decreases the urgency to replace a worn or defective seal.

Alternatively, to reduce an amount of engagement between the sealing member 208 and the seal 210 and/or to reduce an amount of breakout torque required to move the sealing member 208 from the closed position toward the open position, the plurality of fasteners are loosened and the tool is inserted into, for example, the orifice 246 and turned such that the end 252 of the adjuster 248 moves away from the surface 254 in a direction generally represented arrow 260. Once the end 252 of the adjuster 248 is at a distance from the surface 254, a person may grasp and move, for example, the support body 218 along the fluid flow path through the valve body 202 in the direction generally represented by the arrow 260. When the support body 218 is in the desired position, the support body 218 is recoupled to the valve body 202. As discussed above, moving the support body 218 moves the sealing member 208 relative to the seal 210, thereby reducing the amount of sealing engagement between the sealing member 208 and the seal 210 when the butterfly valve 200 is in the closed position.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A rotary valve, comprising:
   a valve body and a bonnet assembly, the valve body comprising:
      a first aperture including a seating surface to be engaged by a seat of a fluid control member to be positioned at least partially within the valve body;
      a second aperture through which an end of the bonnet assembly is to at least partially extend, wherein the second aperture is sized to enable a position of the bonnet assembly to be adjusted; and
      a step within the valve body and adjacent the second aperture to be engaged by one or more corresponding surfaces of the bonnet assembly to at least partially align and support the fluid flow control member relative to the first aperture,
   wherein the bonnet assembly comprises apertures to receive fasteners to couple the valve body to the bonnet assembly, the apertures sized to enable the position of the bonnet assembly and a rotatable shaft thereof to be adjusted relative to the valve body and along a fluid flow path through the valve body and the first aperture.

2. The rotary valve as defined in claim 1, wherein the second aperture is sized to enable the position of the fluid control member to be adjusted relative to the seating surface.

3. The rotary valve as defined in claim 2, wherein the size of the second aperture enables an amount of engagement between the seat and the seating surface to be adjusted.

4. The rotary valve as defined in claim 1, further comprising an externally accessible adjuster to field adjust the position of the bonnet assembly relative to the valve body and along the fluid flow path through the valve body.

5. The rotary valve body as defined in claim 4, wherein the adjuster threadingly engages an opening defined by the valve body.

6. The rotary valve as defined in claim 1, wherein the second aperture comprises an elongated opening.

7. The rotary valve of claim 1, wherein the adjustment of the bonnet assembly relative to the valve body is substantially parallel to the fluid flow path.

8. The rotary valve of claim 1, wherein the second aperture and the apertures of the bonnet assembly enable the bonnet assembly to be field adjusted relative to the valve body.

9. A rotary valve, comprising:
   a valve body having a flow aperture to enable the flow of fluid therethrough;
   a seal surrounding the flow aperture;
   a sealing member having a shaft extending therefrom, wherein the sealing member is movable relative to the seal and the flow aperture to control the flow of fluid through the flow aperture; and
   a support body movably coupled to the valve body and having a passage to receive the shaft, the support body having an end that is to extend through an aperture of the valve body, wherein the support body holds the shaft and the sealing member to enable rotation of the shaft and the sealing member relative to the valve body and the seal, and wherein at least one of the support body or the valve body includes at least one elongated opening to enable movement of the support body relative to the valve body to change an amount of engagement between the sealing member and the seal when the rotary valve is in a closed position, wherein the valve body includes one or more internal surfaces to be engaged by one or more corresponding surfaces of the support body to at least partially align and support the sealing member relative to the flow aperture, the movement of the support body to be substantially parallel to a fluid flow path through the valve body and the flow aperture.

10. The rotary valve as defined in claim 9, wherein the support body defines a plurality of passages to receive one of a plurality of fasteners to movably couple the support body to the valve body.

11. The rotary valve as defined in claim 10, wherein the plurality of passages are sized to enable the position of the support body to be adjusted relative to the valve body to change the amount of engagement between the sealing member and the seal when the fluid valve is in the closed position.

12. A fluid valve, comprising:
   a valve body having a flow aperture to enable the flow of fluid therethrough;
   a seal surrounding the flow aperture;
   a sealing member having a shaft extending therefrom, wherein the sealing member is movable relative to the seal and the flow aperture to control the flow of fluid through the flow aperture; and
   a support body movably coupled to the valve body and having a passage to receive the shaft, the support body having an end that is to extend through an aperture of the valve body, wherein the support body holds the shaft and the sealing member to enable rotation of the shaft and the sealing member relative to the valve body and the seal, and wherein at least one of the support body or the valve body includes at least one elongated opening to enable movement of the support body relative to the valve body to change an amount of engagement between the sealing member and the seal when the fluid valve is in a closed position, wherein the valve body includes one or more internal surfaces to be engaged by one or more corresponding surfaces of the support body to at least partially align and support the sealing member relative to the flow aperture, the movement of the support body to be substantially parallel to a fluid flow path through the valve body and the flow aperture, wherein the fluid valve comprises a butterfly valve.

13. The rotary valve as defined in claim 9, further comprising an externally accessible adjuster to field adjust the position of the support body relative to the valve body to change the amount of engagement between the sealing member and the seal when the rotary valve is in the closed position.

14. The rotary valve as defined in claim 13, wherein the adjuster threadingly engages an opening defined by the valve body.

15. A rotary valve, comprising:
   a valve body having a flow aperture to enable the flow of fluid therethrough;
   a seal surrounding the flow aperture;
   a sealing member having a rotatable shaft extending therefrom, wherein the sealing member is movable relative to the seal and the flow aperture to control the flow of fluid through the flow aperture;
   a support body movably coupled to and at least partially extending through the valve body, the support body having a passage to receive the shaft, wherein the support body holds the shaft and the sealing member to enable rotation of the shaft and the sealing member relative to the valve body and the seal, wherein the valve body includes one or more internal surfaces to be engaged by one or more corresponding surfaces of the support body to at least partially align and support the sealing member relative to the flow aperture; and means for enabling movement of the support body relative to the valve body along a fluid flow path through the valve body and the flow aperture to change an amount of engagement between the sealing member and the seal when the rotary valve is in a closed position.

16. The rotary valve as defined in claim 15, wherein the means for enabling movement of the support body comprises at least one elongated opening in the support body or the valve body to enable movement of the support body relative to the valve body.

17. The rotary valve as defined in claim 16, wherein the support body defines a plurality of passages to receive one of a plurality of fasteners to movably couple the support body to the valve body.

18. The rotary valve as defined in claim 17, wherein the plurality of passages are sized to enable the position of the support body to be adjusted relative to the valve body to change the amount of engagement between the sealing member and the seal when the rotary valve is in the closed position.

19. A rotary valve body, comprising:
a first aperture including a seating surface to be engaged by a seat of a fluid control member to be positioned at least partially within the rotary valve body;
a second aperture through which an end of a bonnet assembly is to at least partially extend, wherein the second aperture is sized to enable a position of the bonnet assembly and a rotatable shaft thereof to be adjusted relative to the rotary valve body and along a fluid flow path through the rotary valve body;
a step within the rotary valve body and adjacent the second aperture to be engaged by one or more corresponding surfaces of the bonnet assembly; and
an externally accessible adjuster to field adjust the position of the bonnet assembly relative to the rotary valve body and along the fluid flow path through the rotary valve body, wherein the adjuster threadingly engages an opening defined by the rotary valve body.

* * * * *